(12) United States Patent
Cheng

(10) Patent No.: US 6,203,211 B1
(45) Date of Patent: Mar. 20, 2001

(54) CONNECTOR FOR A FIBER OPTIC CABLE

(76) Inventor: Yu-Feng Cheng, No. 7, Fuhsing St., Tucheng (TW)

( * ) Notice: Subject to any disclaimer, the term of this patent is extended or adjusted under 35 U.S.C. 154(b) by 0 days.

(21) Appl. No.: 09/300,356

(22) Filed: Apr. 27, 1999

(51) Int. Cl.⁷ .................................................. G02B 6/36
(52) U.S. Cl. .................. 385/78; 385/81; 385/62
(58) Field of Search ................. 385/78, 81, 60, 385/62, 63

(56) References Cited

U.S. PATENT DOCUMENTS

| | | | |
|---|---|---|---|
| 4,327,964 | * 5/1982 | Haesly et al. | 385/78 |
| 5,301,250 | 4/1994 | Cheng | 385/76 |
| 5,590,230 | 12/1996 | Cheng | 385/77 |

* cited by examiner

*Primary Examiner*—Cassandra Spyrou
*Assistant Examiner*—Euncha Cherry
(74) *Attorney, Agent, or Firm*—Gardere Wynne Sewell LLP; Sanford E. Warren, Jr.

(57) ABSTRACT

The invention relates to a connector for a fiber optic cable. The connector has at least three clamps which respectively clamp the outer and the inner cover and also the filament of the fiber optic cable. Due to the engagement with the outer cover, the inner cover and the filament of the fiber optic cable, the connector of the invention is able to secure the alignment of two different filaments when connection therebetween is necessary.

2 Claims, 4 Drawing Sheets

CONNECTOR FOR A FIBER OPTIC CABLE

FIELD OF THE INVENTION

The invention relates to an improved connector for a fiber optic cable, especially to a connector which is able to clamp the inner cover of the fiber optic cable in order to provide better constriction of the movement of the fiber optic cable than the conventional one.

BRIEF DESCRIPTION OF THE RELATED ARTS

Conventional fiber optic connectors are liable to become loose with respect to the fiber optic filament contained therein. To overcome such a problem, an improved connector is introduced. In this connector, multiple transverse slits are provided. Multiple corresponding clamps each having a central opening defined therethrough are respectively located in each corresponding slit. Thereafter, the clamps are able to clamp the respective fiber optic cable inserted into the central openings of the connector.

The conventional connector is improved, though, it still has drawbacks since the clamps only clamp the outer cover of the fiber optic cable. The inner cover of the fiber optic cable is not directly constricted with respect to the connector so the fiber optic filament, to a certain degree, is still able to move. That sometimes causes inaccurate alignment of two fiber optic filaments when two connectors are needed to be joined together. This may in turn cause the degradation, disruption and/or loss of the signals transmitted between the two fiber optic filaments. To rectify the defect, U.S. Pat. Nos. 5,301,250 and 5,590,230 introduce a manner to align two fiber optical wire. Still, the filament of the optical wire can not be accurately aligned with one another even though the situation of alignment between two different fiber optical wire is improved.

The present invention aims to provide an improved fiber optical connector to obviate and/mitigate the aforementioned problems.

SUMMARY OF THE INVENTION

The main objective of the invention is to provide an improved fiber optic connector, which is able to provide a stronger connection between the connector to the fiber optic filament contained therein than the existing connectors.

Another objective of the invention is to provide an improved fiber optic connector, which is able to prevent any deviation of the fiber optic filament when in alignment with another one, thus provide accurate alignment for the two fiber optic filaments.

Yet another objective of the invention is to provide an improved fiber optic connector in which a cover with a button means is provided in order to protect the connector and the fiber optic filament contained therein from dust and vapor.

DETAILED DESCRIPTION OF THE PREFERRED EMBODIMENT

Figure 1:
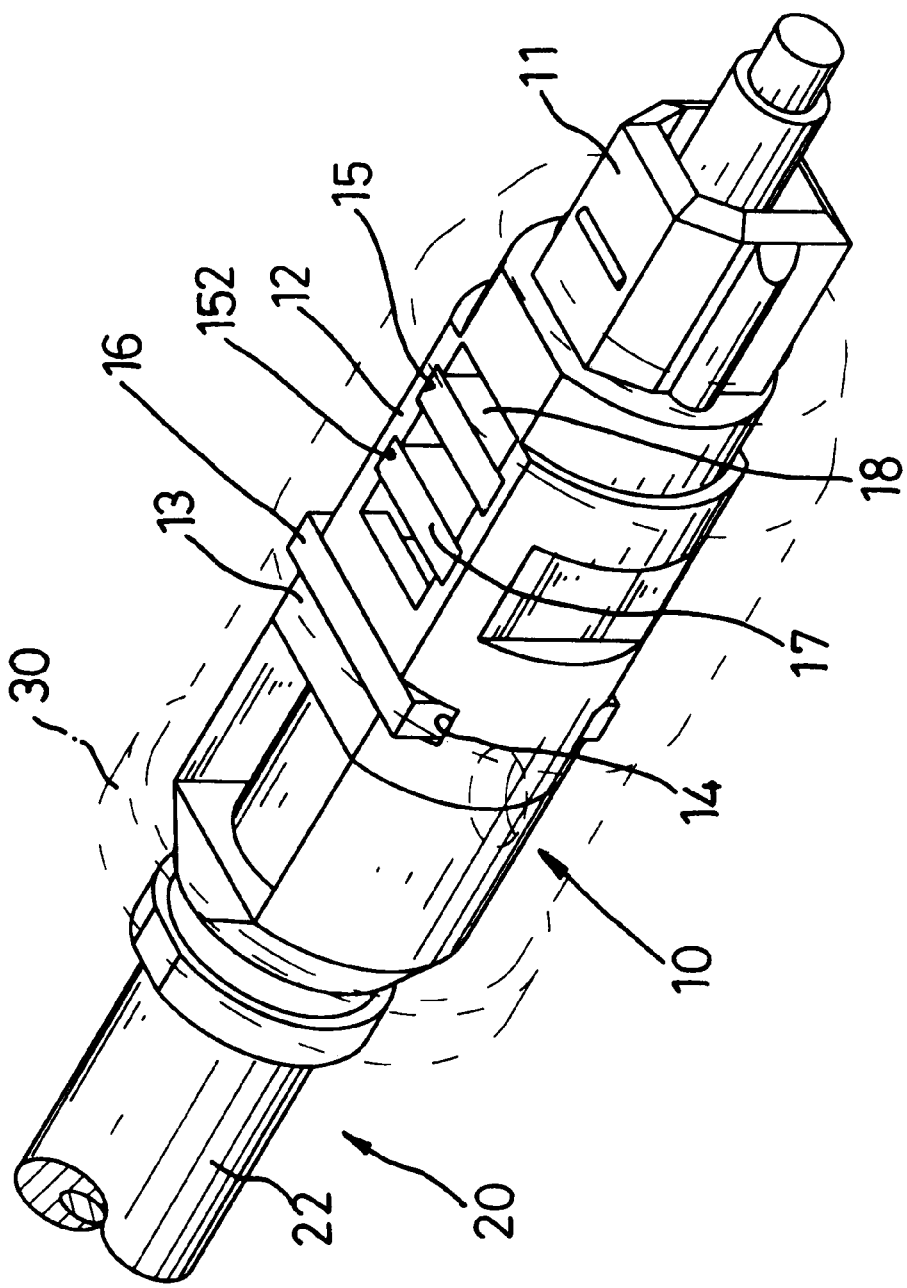
FIG. 1 is a perspective view of the connector in accordance with the invention.

As shown in FIG. 1, a connector (10) constructed in accordance with the present invention is a hollow tube having a fiber optic cable (20) therein and a cover (30) (shown in phantom lines) thereon.

Figure 2:
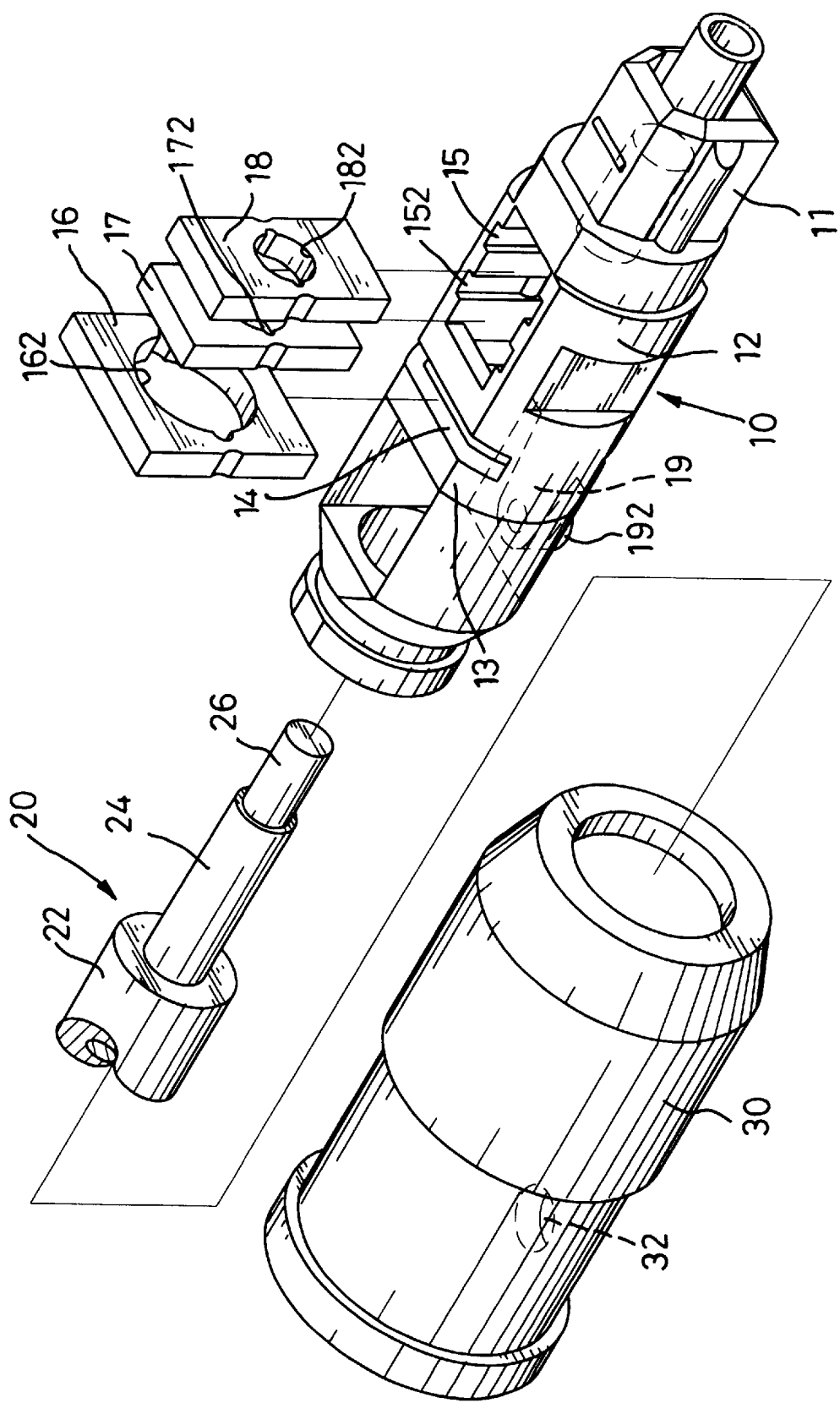
FIG. 2 is an exploded perspective view of the connector in FIG. 1.
Figure 3:
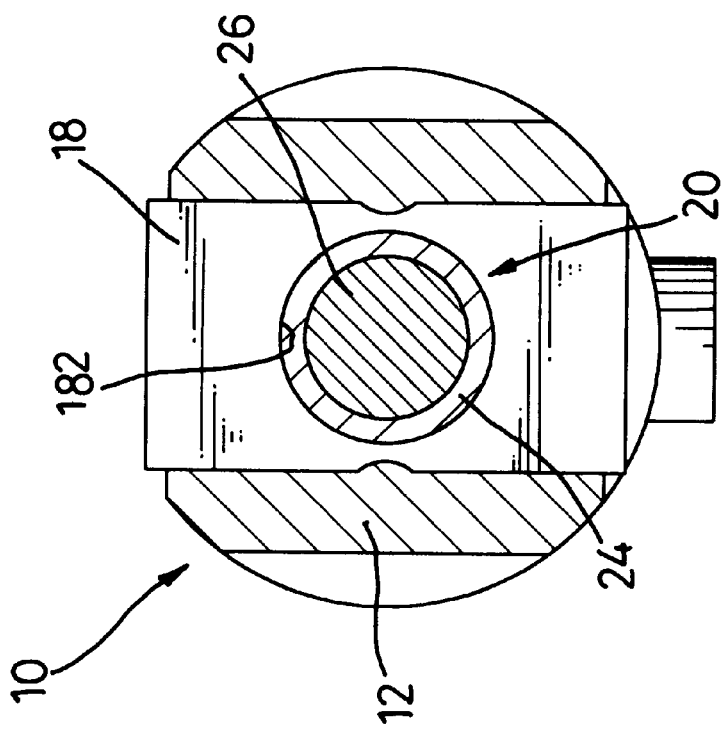
FIG. 3 is a plan cross sectional view showing the state of the clamps when not connected with the fiber optic cable.

As shown in FIG. 2, the connector (10) includes a head (11), a waist (12) and a holding portion (13). At least one transverse slit (14) is defined in the holding portion (13), and for each slit (14), a corresponding first clamp (16) having a central opening (162) for receiving the fiber optic cable (20) therein is provided. Likewise, at least two transverse slits (15, 152) are defined in the waist (12) and for each slit (15, 152), a corresponding second and third clamp (17, 18) respectively having a central opening (172, 182) for receiving the fiber optic cable (20) therein is provided. The first, second and third clamps (16, 17, 18) are respectively pre-inserted in the slits (14, 15, 152).

Figure 4:
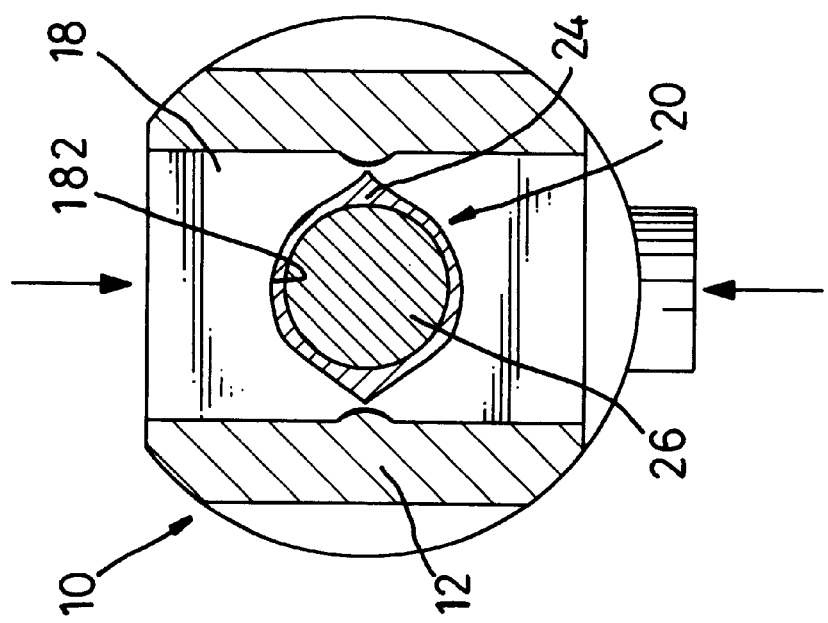
FIG. 4 is a plan cross sectional view showing the fiber optic cable tightly clamped by the clamps.

The fiber optic cable (20) comprises an outer cover (22), an inner cover (24) and a filament (26). In assembling the connector (10) with the fiber optic cable (20), the outer and the inner covers (22, 24) should be peeled off for a certain length, as shown in FIG. 2, in order to expose a certain length of the inner cover (24) and the filament (26). Then the peeled-off fiber optic cable (20) is inserted into the connector (10) through the respective central openings (162, 172, 182) of the clamps (16, 17, 18) so that the outer cover (22), the inner cover (24) and the filament (26) of the fiber optic (20) are respectively located in the holding portion (13), the waist (12), and the head (11) of the connector (10) and through the respective central openings (162, 172, 182) of the first, second and third clamps (16, 17, 18). The clamps (16, 17, 18) are then forcefully pressed inwardly in the direction shown by the arrows in FIG. 4, to tightly clamp the fiber optic cable (20) therein. Shown in FIG. 4 is the state where the fiber optic cable (20) is tightly clamped by the third clamp (18).

Figure 5:
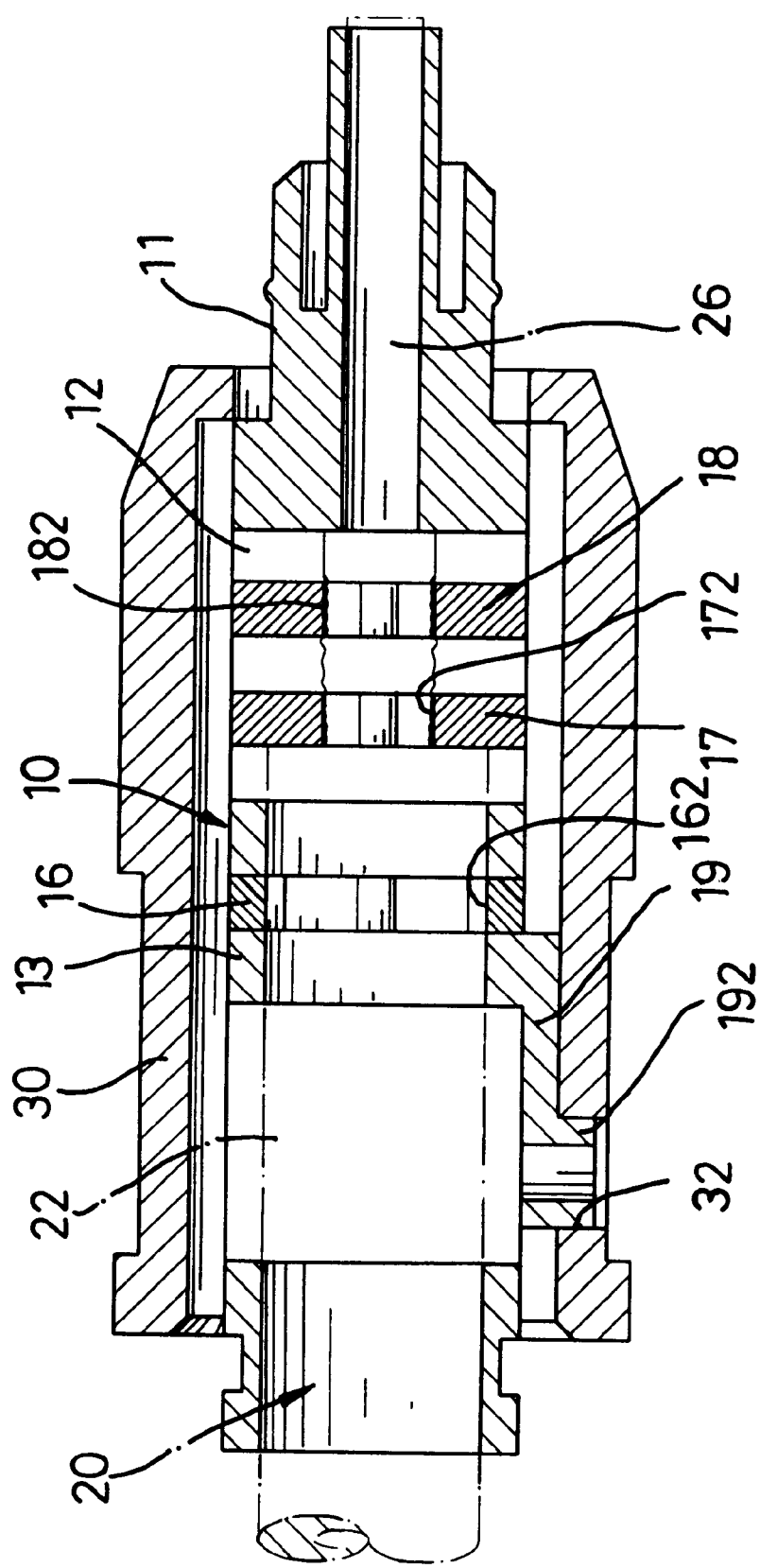
FIG. 5 is a longitudinal cross sectional view showing an assembled connector in accordance with the present invention.

As shown in FIG. 5, compared with the connector mentioned in the related arts, the outer cover (22), the inner cover (24) and even the filament (26) are clamped by clamps (16, 17, 18) of the invention, so a stronger connection between the connector (10) and the fiber optic cable (20) than the conventional connectors is attained.

In addition, the direct clamping of the inner cover (24) provided by the second clamp (17) prevents any deviation of the filament (26) thereby allowing an accurate alignment for connection between two fiber optic cables.

In FIGS. 1, 2 and 5, a cover (30) is provided in order to protect the connector (10) and the fiber optic cable (20) contained within the connector (10) from dust and vapor. The cover (30) comprises an opening (32) which in cooperation with a protrusion (192) formed on the free end of an inclined extension (19) extending from a bottom face of the connector (10) to achieve a secure connection therebetween so as to ensure that the cover (30) engages firmly with the connector (10).

What is claimed is:

1. A connector for a fiber optic cable having a head, a waist, and a holding portion, and being hollow to contain the fiber optic cable therein, wherein the improvements comprise:

at least one transverse slit (14) defined in the holding portion (13) and for each of said at least one slit (14), a corresponding first clamp (16) having a central opening (162) for receiving and clamping the outer cover (22) of the fiber optic cable (20);

at least two transversely defined slits (15, 152) defined in the waist (12) and for each of said slits (15, 152), two corresponding second and third clamps (17,18) each having a central opening (172, 182) for receiving and clamping the inner cover (24) and the filament (26) of the fiber optic cable (20).

2. The connector as claimed in claim 1, wherein a cover (30) having an opening (32) peripherally defined therein is provided on the outside of the connector (10); and an inclined extension (19) extending from the bottom face of the connector (10) has a protrusion (192) formed on the distal end thereof and corresponds to the opening (32) of the cover (30).

* * * * *